P. E. GRAY.
LITTER CARRIER HOLDFAST.
APPLICATION FILED APR. 11, 1911.
1,012,628.
Patented Dec. 26, 1911.
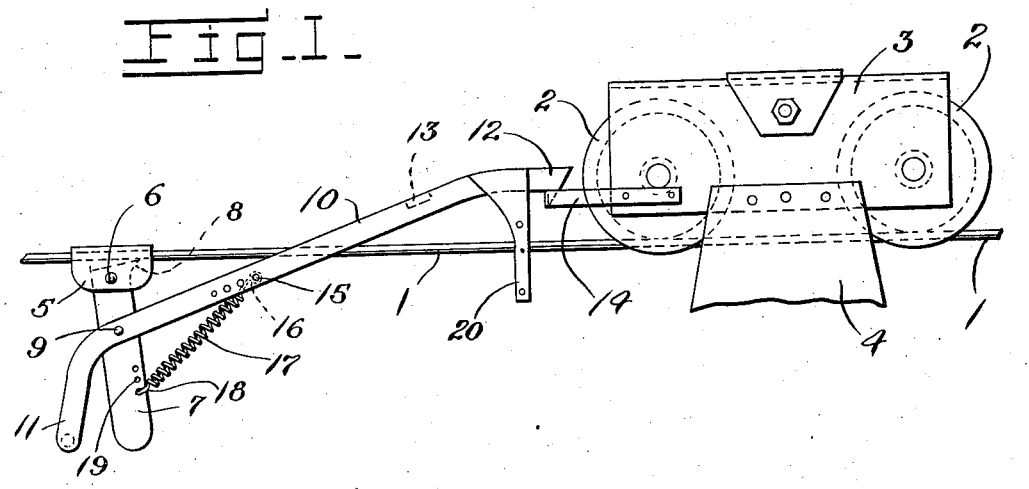
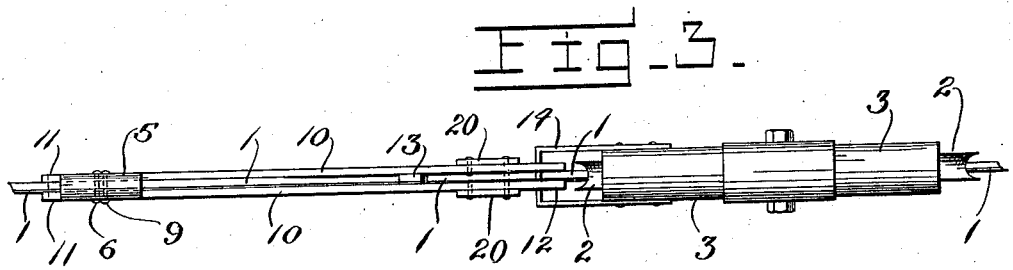
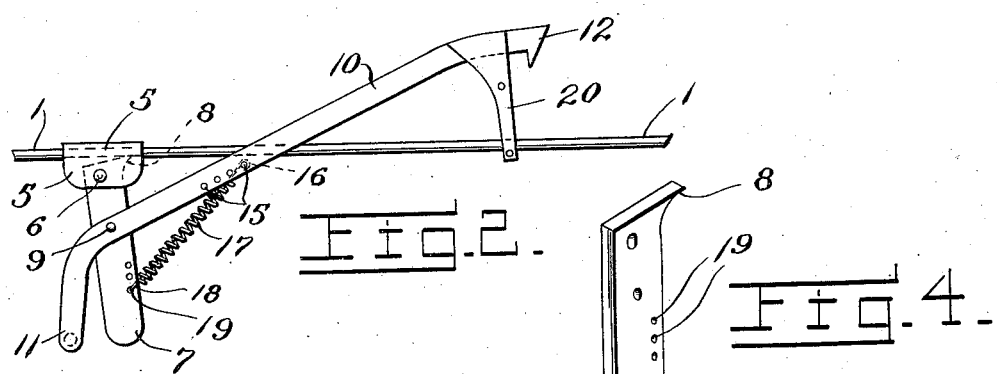
Witnesses
Charles J. MacCarter
M. L. Neal
Inventor
Paul E. Gray.
By Harry Ellis Chandlee,
Attorney
COLUMBIA PLANOGRAPH CO., WASHINGTON, D. C.

UNITED STATES PATENT OFFICE.

PAUL E. GRAY, OF SAUK CENTER, MINNESOTA.

LITTER-CARRIER HOLDFAST.

1,012,628.  Specification of Letters Patent.  Patented Dec. 26, 1911.

Application filed April 11, 1911. Serial No. 620,343.

*To all whom it may concern:*

Be it known that I, PAUL E. GRAY, a citizen of the United States, residing at Sauk Center, in the county of Stearns and State of Minnesota, have invented certain new and useful Improvements in Litter-Carrier Holdfasts, of which the following is a specification.

My invention relates to improvements in litter carriers and has for its leading object the provision of an improved device which may be readily secured upon the trolley wire or track of an elevated carrier and which will serve to both limit the movement of the carrier on the track and to lock the carrier in position until released.

A further object of my invention is the provision of an improved device of this character adapted to be slidably mounted on the trolley wire or track which will be provided with means for automatically engaging the track to lock my device in adjusting position thereon.

Another object of the invention is the provision of a simple and efficient device for limiting the movement of aerial carriers and securing the same in position, which device will employ but a single spring for both locking the device in adjusted position upon the track and for resiliently holding the abutment and locking arm.

Other objects and advantages of my invention will be apparent from the following description taken in connection with the accompanying drawings, and it will be understood that I may make any modification in the specific structure shown and described within the scope of my claims without departing from or exceeding the spirit of the invention.

Figure 1 represents a side elevation of my complete device employed to lock an aerial carrier in position. Fig. 2 represents a similar side elevation showing the locking lever in disengaging position. Fig. 3 represents a top plan view of my device, and Fig. 4 represents a detailed view of the cam headed lever.

In the drawings: the numeral 1 designates the trolley wire or track on which rests the groove wheels 2 connected by the frame work 3 from which depends the carrier 4 said parts being of any ordinary construction.

Slidably mounted upon the track wire 1 is the U-shaped plate 5 which spans said track wire, while catching through the parallel portion of the plate 5 below the wire is the pivot pin 6 which also passes through the upper end of the locking plate or lever 7. Said lever 7 has a pointed lug 8 projecting from one side and thus providing a substantially cam shaped head for the upper ends of the lever, said lug or portion 8 being adapted to be forced into clamping engagement with the wire 1 to prevent the sliding of the plate 5 along said wire.

The plate or lever 7 depends in alinement with the wire 1, while pivoted to the lever 7 and disposed one on each side thereof and retained by the pivot bolt 9 are the levers 10 having the downwardly curving united handle portions 11 and having their other ends formed with the hook portions 12, spacing blocks 13 being interposed between the two lever plates 10 to hold them in spaced relation and prevent their binding against the track wire.

Secured to the frame 3 of the carrier is the U-shaped plate 14 adapted to be engaged by the hook 12, while to resiliently hold the hook down against the said U plate 14, I secure to one of the cross bolts 15 the hooked end 16 of the helical spring 17 having its other hooked end 18 engaged in one of the apertures 19 formed in the lever 7. It will thus be seen that the spring may be engaged on various bolts 15 and in different apertures 19 to regulate its tension, while the tension of the spring serves to draw the lower end of the lever 7 and the hook bearing portion of the lever plates 10 toward each other, thus forcing the lug 8 into clamping engagement with the wire 1 to lock the device in adjusted position while forcing the hook 12 down against the plate 14 to secure the carrier in position.

To serve as an abutment to limit the movement of the carrier toward the locking device, and further to serve as guides to insure the correct positioning of the hooks 12, I secure to the lever plates 10 near their outer ends the depending plates 20 which span the track 1 and thus guide the position of the hooks 12 while engaging the rear portion of the U-plate 14 and limiting the movement thereof.

From the foregoing description taken in connection with the drawings, the construction and use of my improved attachment for aerial carriers will be readily understood, and it will be seen that I have provided a simple, practical and efficient device which may be readily secured to a track wire for an elevated or aerial carrier and which can be slid along said track wire to desired adjusted position and when in said position will automatically lock itself against movement along the track and will engage and lock in position the elevated carrier traveling on the track, a single spring controlling both of the operations of the device.

I claim.

1. The combination with a track wire, of a U-shaped plate spanning said track wire, a lever pivoted between the parallel portions of the plate and having a cam head for clampingly engaging the track wire, a pair of plates pivotally secured to the lever on opposite sides thereof, guide members secured to said plates and depending therefrom and spanning the track wire, said plates being formed with hook shaped ends, and a spring having one end adjustably secured to the plates and the other adjustably secured to the lever for forcing said parts toward each other.

2. The combination with a track wire, of a U-plate slidably mounted thereon a lever pivoted to the U plate and having a cam head for clampingly engaging the wire, locking plates pivoted to the lever and projecting upward above the wire and terminating in hook shaped ends, means for holding the plates in spaced relation, and a spring having one end secured to the plates and the other to the lever for resiliently holding both the plates and the lever in locking positions.

3. The combination with a track wire of a U plate slidably mounted thereon, a lever having one end pivoted to said plate, a lever plate pivoted to the lever, and a spring connecting the lever and lever plate for moving said parts into operative position.

In testimony whereof I affix my signature, in the presence of two witnesses.

PAUL E. GRAY.

Witnesses:
J. LESLIE GRAY,
J. F. COOPER.

Copies of this patent may be obtained for five cents each, by addressing the "Commissioner of Patents, Washington, D. C."